(12) United States Patent
Jung et al.

(10) Patent No.: US 12,308,582 B2
(45) Date of Patent: May 20, 2025

(54) CHARGING CONTROL BOX DETACHABLE CHARGING CABLE SYSTEM

(71) Applicants: Hyundai Motor Company, Seoul (KR); Kia Corporation, Seoul (KR); THN Corporation, Daegu (KR)

(72) Inventors: Yun Jae Jung, Gyeonggi-do (KR); Seung Min Yoo, Jeollabuk-do (KR); Byeong Kyu Kim, Seoul (KR); Yun Chan Hwang, Gyeonggi-do (KR); Jeong Ki Kyeong, Gyeonggi-do (KR); Jong Hyok Kim, Gyeonggi-do (KR); Tae Hong Yun, Gyeonggi-do (KR)

(73) Assignees: Hyundai Motor Company, Seoul (KR); Kia Corporatoin, Seoul (KR); THN Corporation, Daegu (KR)

( * ) Notice: Subject to any disclaimer, the term of this patent is extended or adjusted under 35 U.S.C. 154(b) by 376 days.

(21) Appl. No.: 17/885,405

(22) Filed: Aug. 10, 2022

(65) Prior Publication Data
US 2023/0083889 A1   Mar. 16, 2023

(30) Foreign Application Priority Data
Sep. 14, 2021   (KR) ........................ 10-2021-0122617

(51) Int. Cl.
*H01R 24/28*   (2011.01)
*B60L 53/16*   (2019.01)
(Continued)

(52) U.S. Cl.
CPC .............. *H01R 24/28* (2013.01); *B60L 53/16* (2019.02); *B60L 53/18* (2019.02); *H01R 13/44* (2013.01);
(Continued)

(58) Field of Classification Search
CPC .... H01R 24/28; H01R 13/6456; H01R 24/20; H01R 2107/00; B60L 53/18; B60L 53/16;
(Continued)

(56) References Cited

U.S. PATENT DOCUMENTS 7,056,149 B1 *  6/2006  Lanni ................... H01R 13/641
                                                    439/680
7,195,519 B1 *  3/2007  McAlonis ............ H01R 13/518
                                                    439/701
(Continued)

FOREIGN PATENT DOCUMENTS

JP           5879561 B2     3/2016
KR    10-2016-0120093 A    10/2016
(Continued)

*Primary Examiner* — Abdullah A Riyami
*Assistant Examiner* — Thang H Nguyen
(74) *Attorney, Agent, or Firm* — Fox Rothschild LLP

(57) ABSTRACT

A charging control box detachable charging cable system includes a vehicle cable having a vehicle terminal on one end for connection to a first connection terminal of a charging control box or an external power source, and an outlet on the other end for connection to a charging inlet of a vehicle. The system also includes a portable cable having one end for connection to the external power source, and a portable terminal provided on the other end for connection to a second connection terminal of the charging control box. The vehicle terminal has a first corresponding key configured to be engaged and coupled with the first key of the first connection terminal, and the portable terminal has a second corresponding key configured to be engaged and coupled with the second key of the second connection terminal.

12 Claims, 7 Drawing Sheets

(51) Int. Cl.
*B60L 53/18* (2019.01)
*H01R 13/44* (2006.01)
*H01R 13/621* (2006.01)
*H01R 13/66* (2006.01)
*H01R 24/20* (2011.01)
*H02J 7/00* (2006.01)
*H01R 107/00* (2006.01)

(52) U.S. Cl.
CPC ....... *H01R 13/621* (2013.01); *H01R 13/6683* (2013.01); *H01R 24/20* (2013.01); *H02J 7/0045* (2013.01); *H02J 7/0047* (2013.01); *H01R 2107/00* (2013.01); *H01R 2201/26* (2013.01)

(58) Field of Classification Search
CPC ....... H02J 7/0045; H02J 7/0047; Y02T 90/14; Y02T 10/7072
See application file for complete search history.

(56) References Cited

U.S. PATENT DOCUMENTS

| | | | |
|---|---|---|---|
| 7,258,493 B2* | 8/2007 | Milette | G02B 6/3831 439/680 |
| 8,241,068 B2* | 8/2012 | Millard | H01R 13/6461 439/660 |
| 9,017,111 B2* | 4/2015 | Zheng | H01R 13/4223 439/744 |
| 9,634,435 B1 | 4/2017 | Raschilla et al. | |
| 2012/0112697 A1* | 5/2012 | Heuer | B60L 53/60 320/109 |
| 2015/0217654 A1* | 8/2015 | Woo | B60L 53/18 320/109 |
| 2016/0200206 A1* | 7/2016 | Woo | B60L 53/11 320/109 |
| 2018/0072169 A1* | 3/2018 | Lee | B60L 53/305 |

FOREIGN PATENT DOCUMENTS

| | | |
|---|---|---|
| KR | 10-2017-0009353 A | 1/2017 |
| KR | 10-1952159 B1 | 2/2019 |
| WO | WO-2021206211 A1 * | 10/2021 |

* cited by examiner

[FIG. 1] (Prior Art)
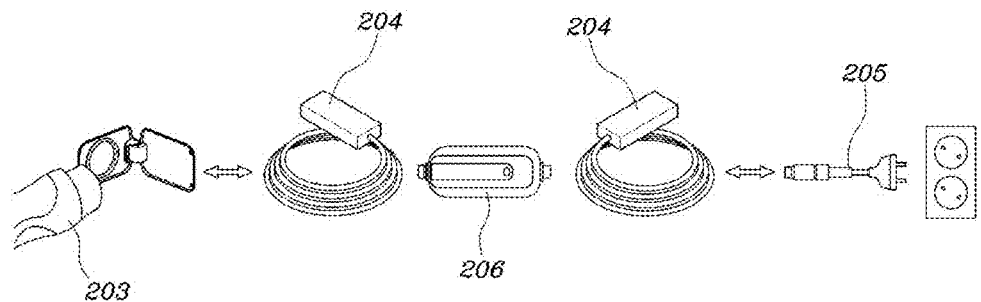
[FIG. 2] (Prior Art)
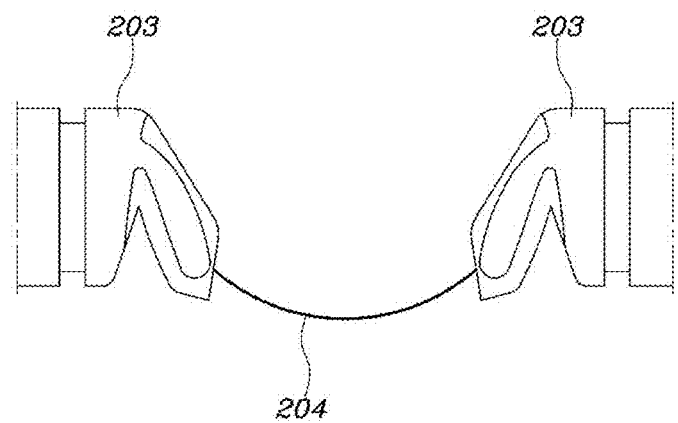

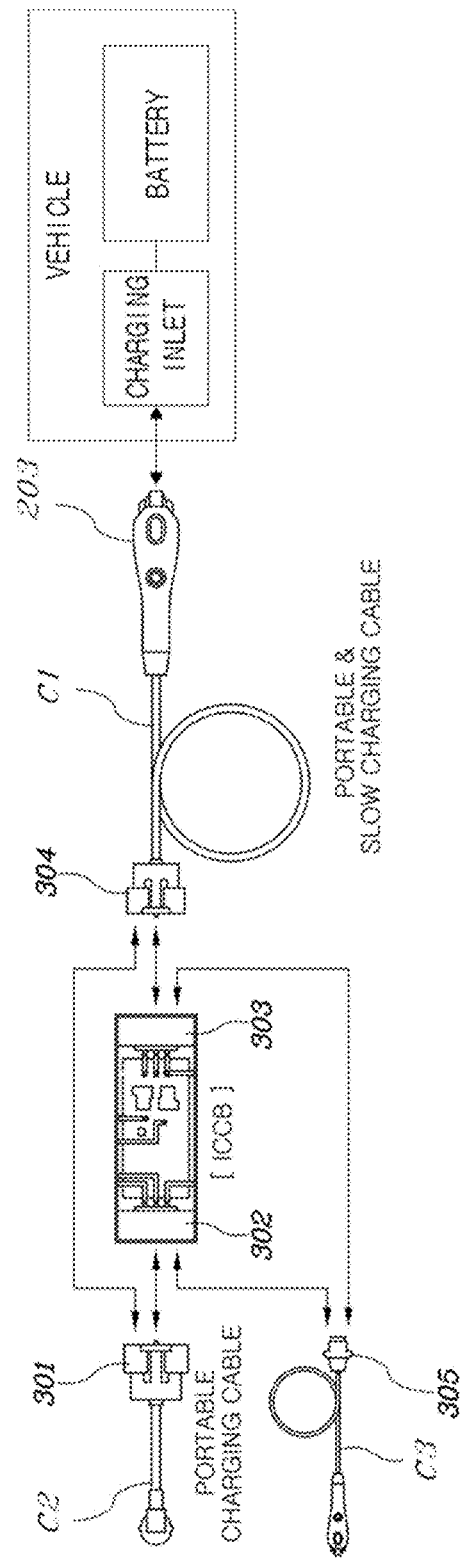
[FIG. 3]

[FIG. 4]
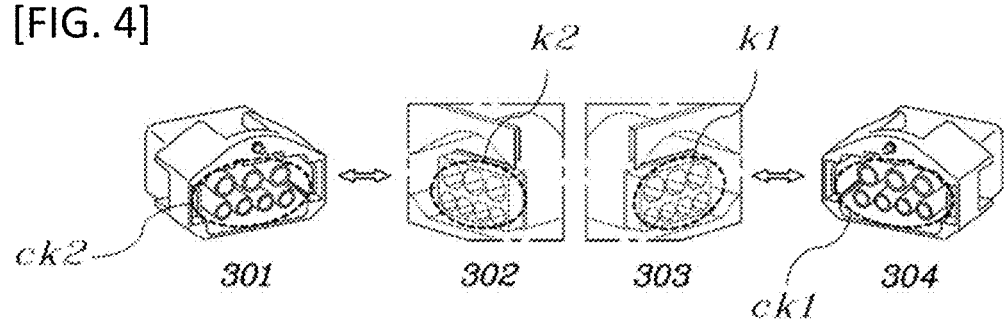
[FIG. 5]
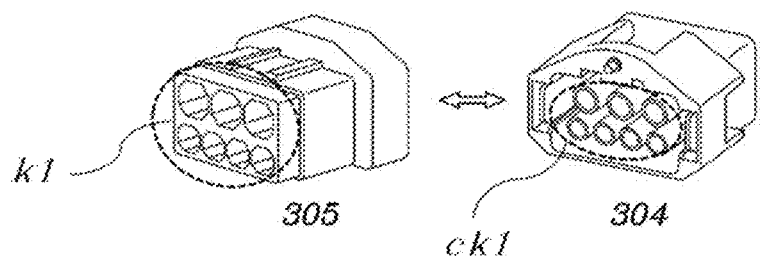
[FIG. 6A]
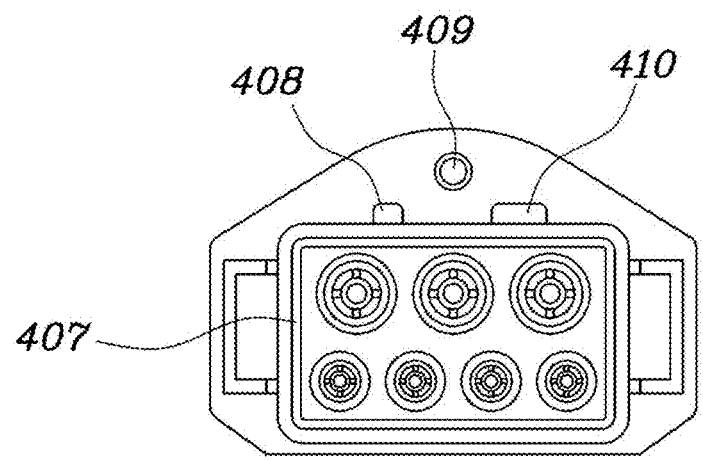

[FIG. 6B]
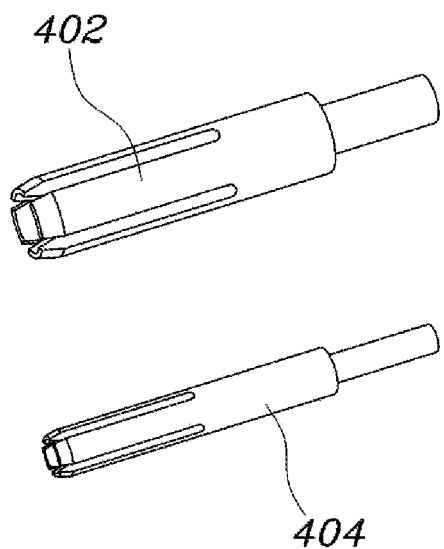
[FIG. 6C]
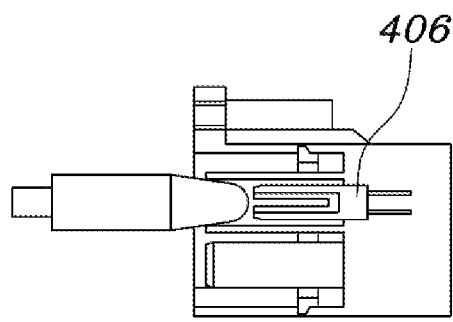

[FIG. 7A]
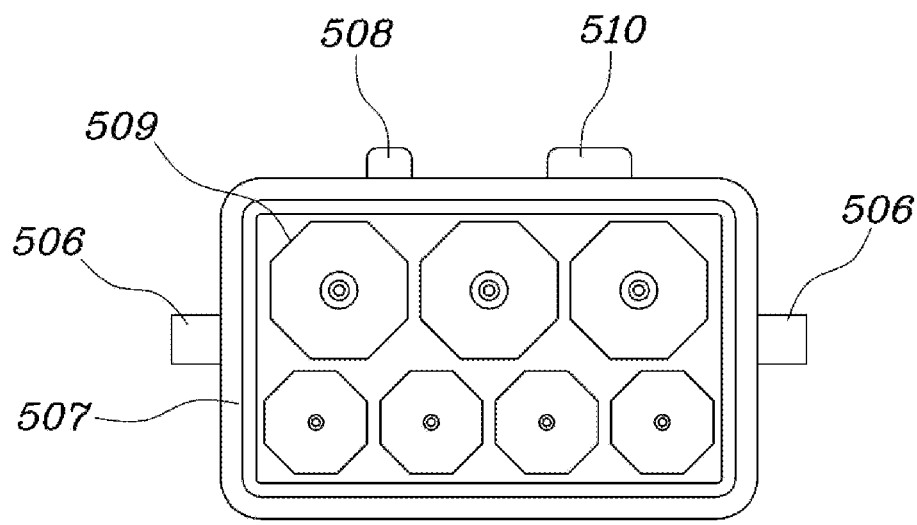
[FIG. 7B]
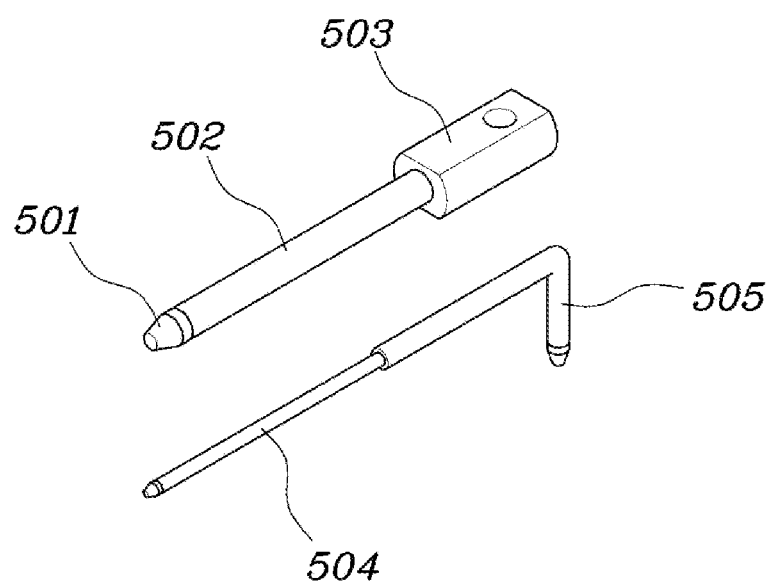

[FIG. 8A]
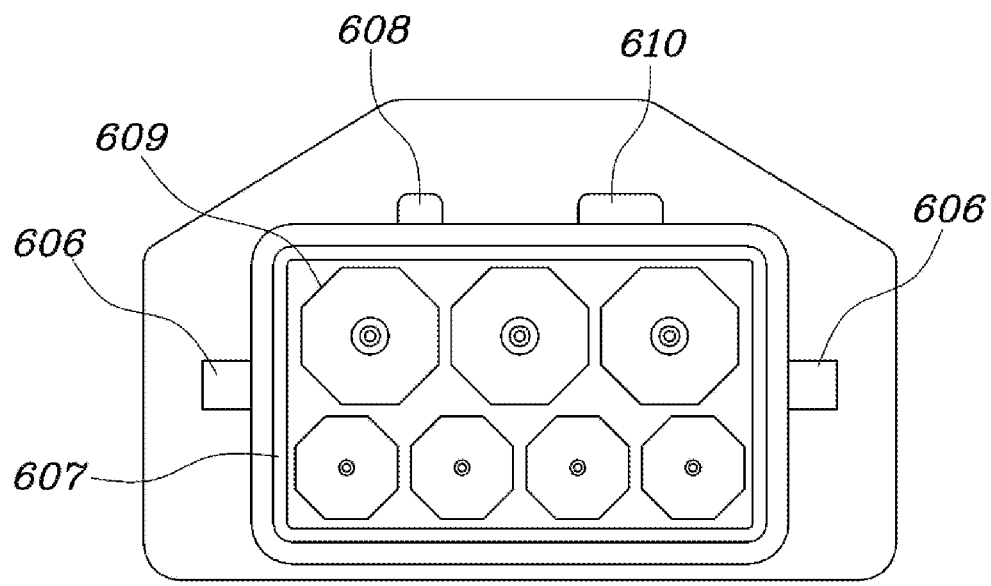
[FIG. 8B]
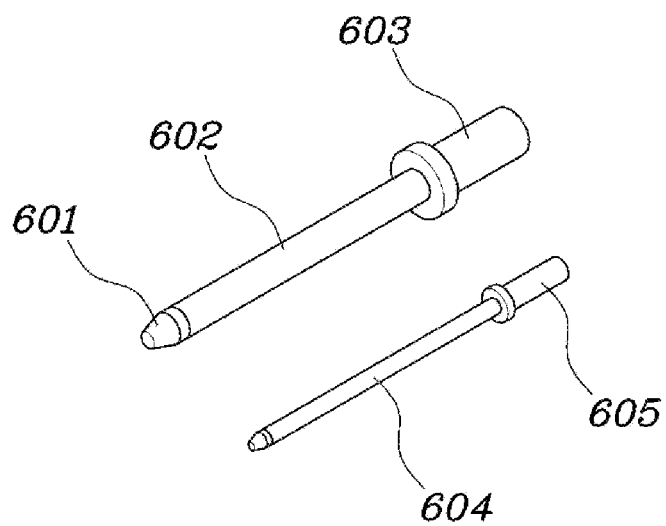

[FIG. 9]
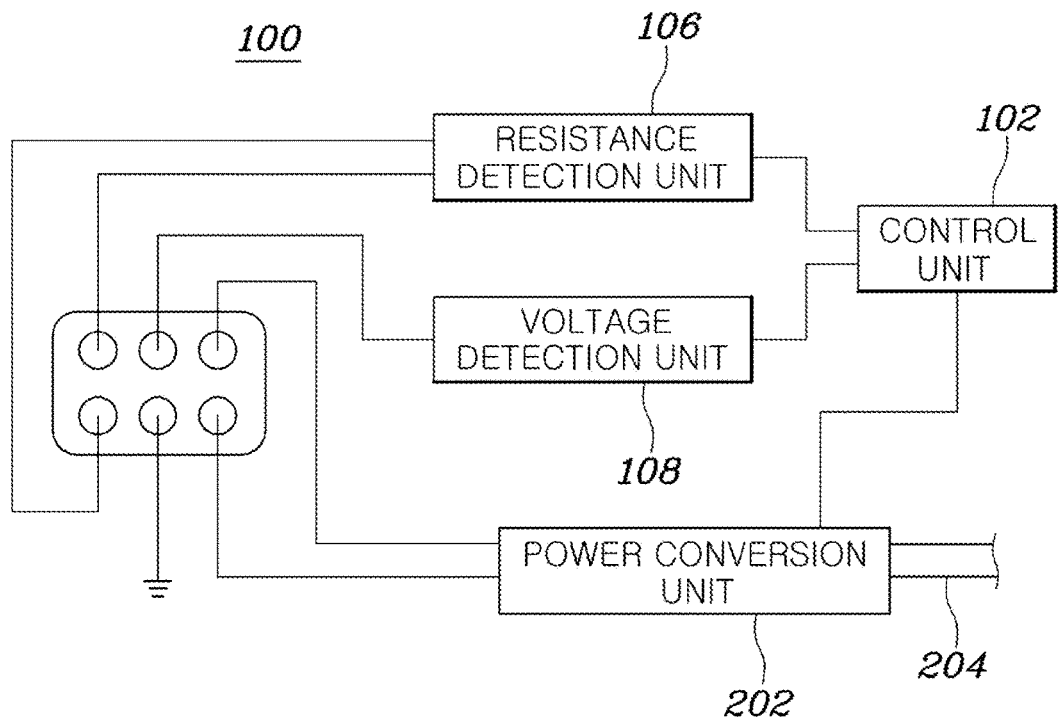
[FIG. 10]
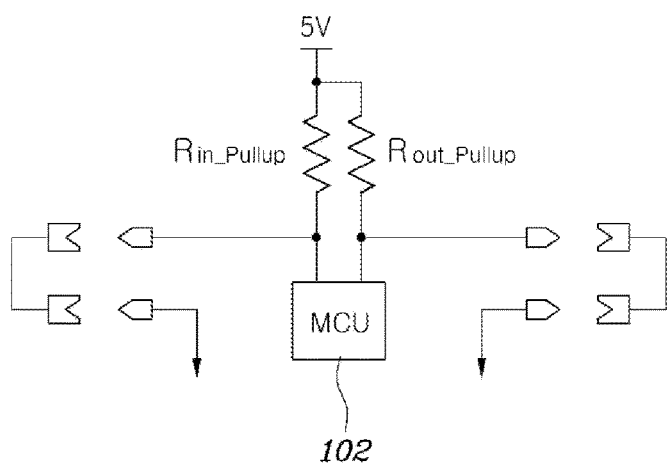

CHARGING CONTROL BOX DETACHABLE CHARGING CABLE SYSTEM

CROSS REFERENCE TO RELATED APPLICATION

The present application claims under 35 U.S.C. § 119(a) the benefit of Korean Patent Application No. 10-2021-0122617 filed on Sep. 14, 2021, the entire contents of which are incorporated by reference herein for all purposes.

BACKGROUND

Technical Field

The present disclosure relates to a charging control box detachable charging cable system, and more specifically, to a charging control box detachable charging cable system that prevents various charging equipment from being erroneously fastened to a cable by providing a detachable common cable, and providing physical and electrical devices that confirm a fastened state, to address the problems of increasing the weight of a vehicle and the consumer's purchase cost caused by mounting and using all of an in-cable control box (ICCB), a portable cable connected to both ends of the in-cable control box, and a charging cable connected to a charging stand on a vehicle.

Description of the Related Art

Electric vehicles (EVs) and plug in hybrid vehicles (PHVs) incorporate a battery configured to store power. The stored power is supplied to one or more electric motors of the vehicle during operation of the vehicle. Systems for charging batteries are classified into the following categories: portable charging systems configured to charge an in-vehicle battery through a household power source; slow charging systems configured to slowly charge the in-vehicle battery through a charging stand; and quick charging systems configured to quickly charge the in-vehicle battery through an electric vehicle charging station. In each of these categories, the battery is charged through a plug-in charging method using electrically-conductive wire.

The portable charging system and the slow charging system having high utilization rates among charging systems. Thus, a user who wants to use these types of systems for in-vehicle charging needs to have in the vehicle two different cables suitable for each respective charging system. The need for multiple charging cables increases the purchase price of the vehicle. Also, because the cables are mounted on the vehicle, the weight of the vehicle is increased, thereby increasing vehicle power consumption; and causing inconvenience to the user.

The matters explained above as the relevant art are for the purpose of enhancing the understanding of the background of the present disclosure and are merely technical information that the inventor retained during the process of developing the embodiments of the present disclosure, or acquired during the development process. This information is not intended to limit the present disclosure to the related art already known to those skilled in the art.

SUMMARY

The present disclosure is proposed to address the above problems, and the disclosure relates to provides a charging control box detachable charging cable system, which prevents various charging equipment from being erroneously fastened to a cable by providing a detachable common cable, and providing physical and electrical devices that confirm a fastened state of the cable system. The cable system addresses the problems of increased vehicle weight and increased vehicle purchase cost caused by mounting in the vehicle and using an in-cable control box (ICCB), a portable cable connected to both ends of the in-cable control box, and a charging cable for connecting a charging stand to the vehicle.

The present disclosure is not limited to addressing the aforementioned objects, and other technical objects can also be derived from the following description.

An exemplary embodiment of a charging control box detachable charging cable system is configured to be connected to a charging control box. The charging control box is configured to monitor or control a power charging state of a vehicle. The charging control box incudes: a first connection terminal and a second connection terminal disposed on opposite sides of the charging control box; a first key disposed on the first connection terminal, and a second key disposed on the second connection terminal.

The charging control box detachable charging cable system includes a vehicle cable having a vehicle terminal disposed on a first end of the vehicle cable and configured to be connected to any one of the first connection terminal of the charging control box and an external power source. The vehicle cable also includes an outlet disposed on a second end of the vehicle cable and configured to be connected to a charging inlet of a vehicle having a battery.

The charging control box detachable charging cable system includes a portable cable having a first end configured to be connected to the external power source. The portable cable also includes a portable terminal disposed on a second end of the portable cable and configured to be connected to the second connection terminal of the charging control box.

The vehicle terminal of the vehicle cable includes a first corresponding key configured to be engaged and coupled with the first key of the first connection terminal. The portable terminal of the portable cable includes a second corresponding key configured to be engaged and coupled with the second key of the second connection terminal.

In another exemplary embodiment, the first corresponding key and the second corresponding key include a first key code and a second key code, respectively; and the first key code and the second key code have different shapes.

In another exemplary embodiment, the vehicle terminal and the portable terminal each include a power source terminal provided with a power source pin receiving a power source; and a ground pin connected to a ground.

In another exemplary embodiment, one end of the power source terminal incudes an insulating cap configured to prevent electric shock to a user due to contact with the power source terminal.

In another exemplary embodiment, the power source terminal includes a housing surrounding the power source pin and the ground pin; and a locking groove formed outside the housing, and fitted into and coupled with any one of the first connection terminal and the second connection terminal.

In another exemplary embodiment, the housing includes a wrench bolt configured to be non-detachable when coupled with any one of the first connection terminal and the second connection terminal.

In another exemplary embodiment, the vehicle terminal and the portable terminal include a signal terminal. The signal terminal includes a temperature sensor pin having with a temperature sensor configured to sense a temperature. The signal terminal also includes an interlock pin having an interlock circuit configured to sense fastened information relating to whether the first key and the first corresponding key are engaged and coupled with each other, and/or whether the second key and the second corresponding key are engaged and coupled with each other.

In another exemplary embodiment, the interlock circuit further includes a voltage control unit configured to detect an output voltage output if an input voltage is input to the interlock circuit. The interlock circuit further includes a control unit configured to sense fastened information based on the detected output voltage, and to interrupt operation of the charging control box if the fastened information indicates that the first key and the first corresponding key are not engaged and coupled with each other, and/or the second key and the second corresponding key are not engaged and coupled with each other.

In another exemplary embodiment, a charging control box detachable charging cable system is configured to be connected to a charging control box. The charging control box is configured to monitor or control a power charging state of a vehicle. The charging control box includes a first connection terminal and a second connection terminal disposed on opposite sides of the charging control box, a first key disposed on the first connection terminal, and a second key disposed on the second connection terminal.

The charging control box detachable charging cable system includes a vehicle cable having a vehicle terminal disposed on a first end of the vehicle cable and configured to be connected to any one of the first connection terminal of the charging control box and an external power source. The vehicle cable also includes an outlet disposed on a second end of the vehicle cable and configured to be connected to a charging inlet of a vehicle having a battery.

The charging control box detachable charging cable system also includes a portable cable having a first end configured to be connected to a first power source. The portable cable also includes a portable terminal disposed on a second end of the portable cable and configured to be connected to the second connection terminal of the charging control box.

The charging control box detachable charging cable system also includes a charger cable having a first end configured to be connected to a second power source, and a charger terminal disposed on a second end of the charger cable and configured to be connected to the vehicle terminal.

The vehicle terminal includes a first corresponding key configured to be engaged and coupled with the first key of the first connection terminal. The portable terminal includes a second corresponding key configured to be engaged and coupled with the second key of the second connection terminal. The charger terminal includes another first key configured to be engaged and coupled with the first corresponding key of the vehicle terminal.

In another exemplary embodiment, the first power source is a household AC power source, and the second power source is an AC power source for a slow charger.

In another exemplary embodiment, the first corresponding key and the second corresponding key include a first key code and a second key code, respectively, and the first key code and the second key code have different shapes.

In another exemplary embodiment, the vehicle terminal, the portable terminal, and the charger terminal each include a power source terminal provided with a power pin configured to receive a power source; and a ground pin configured to be connected to a ground.

In another exemplary embodiment, one end of the power source terminal includes an insulating cap configured to prevent electric shock to a user due to contact with the power source terminal.

In another exemplary embodiment, the power source terminal includes a housing surrounding the power pin and the ground pin; and a locking groove formed outside the housing, and configured to be fitted into and coupled with any one of the first connection terminal and the second connection terminal.

In another exemplary embodiment, the housing includes a wrench bolt configured to be non-detachable when coupled with any one of the first connection terminal and the second connecter terminal.

It is possible to prevent various charging equipment from being erroneously fastened by providing a detachable common cable and providing physical and electrical devices that confirm a fastened state, to address the problems of increasing the weight of a vehicle and the consumer's purchase cost caused by mounting and using all of an in-cable control box (ICCB), a portable cable connected to both ends of the in-cable control box, and a charging cable connected to a charging stand on a vehicle.

The effect of the present disclosure is not limited to the aforementioned technical effect, and other technical effects can also be derived from the following description.

BRIEF DESCRIPTION OF THE DRAWINGS

The above and other objects, features and other advantages of the present disclosure will be more clearly understood from the following detailed description when taken in conjunction with the accompanying drawings, in which:

FIG. 1 is a diagram showing a charging control box and a charging cable in a conventional charging system.

FIG. 2 is a diagram showing a charging cable in another conventional charging system.

FIG. 3 is a diagram showing a charging control box detachable charging cable system according to an exemplary embodiment of the present disclosure.

FIG. 4 is a diagram showing a vehicle terminal and a portable terminal of the charging control box detachable charging cable system according to the exemplary embodiment of the present disclosure.

FIG. 5 is a diagram showing a charger terminal of the charging control box detachable charging cable according to the exemplary embodiment of the present disclosure.

FIG. 6A is a diagram showing key codes and a housing of the vehicle terminal according to the exemplary embodiment of the present disclosure.

FIG. 6B is a diagram showing a power source terminal and a signal terminal of the vehicle terminal according to the exemplary embodiment of the present disclosure.

FIG. 6C is a diagram showing an electric shock hole of the vehicle terminal according to the exemplary embodiment of the present disclosure.

FIG. 7A is a diagram showing key codes, a partition wall, locking grooves and a housing of the portable terminal according to the exemplary embodiment of the present disclosure.

FIG. 7B is a diagram showing a power source terminal and a signal terminal of the portable terminal according to the exemplary embodiment of the present disclosure.

FIG. 8A is a diagram showing key codes, a partition wall, locking grooves and a housing of the charger terminal according to the exemplary embodiment of the present disclosure FIG. 8B is a diagram showing a power source terminal and a signal terminal of charger terminal according to the exemplary embodiment of the present disclosure.

FIG. 9 is a diagram showing a configuration for detecting the erroneous fastening of the charging control box detachable charging cable system according to the exemplary embodiment of the present disclosure.

FIG. 10 is a diagram showing an interlock circuit of the charging control box detachable charging cable system according to the exemplary embodiment of the present disclosure.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium may also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure. Since the embodiments are only examples and may be implemented in various different forms by those skilled in the art to which the present disclosure pertains, the present disclosure is not limited to the embodiments described herein.

Specific structural or functional descriptions presented in exemplary embodiments of the present disclosure disclosed in the present specification or application are only exemplified for the purpose of describing the exemplary embodiments according to the present disclosure, and the exemplary embodiments according to the present disclosure can be carried out in various forms and should not be interpreted as being limited to the exemplary embodiments described in the present specification or application.

In addition, to clearly describe the present disclosure, the portions irrelevant to the description have been omitted, and throughout the specification, the same or similar components are denoted by the same reference numerals. In addition, the singular form includes the plural form unless otherwise specified in the context.

In addition, in the following description, the reason why the names of the components are divided into the first, the second, etc. is to distinguish the names of the components because they have the same relationship, and the following description is not necessarily limited to the order thereof. For example, a first component can be referred to as a second component, and similarly, the second component can also be referred to as the first component, without departing from the scope according to the concept of the present disclosure.

Unless defined otherwise, all terms used herein, including technical or scientific terms, have the same meaning as commonly understood by those skilled in the art to which the present disclosure pertains. Terms such as those defined in commonly used dictionaries should be interpreted as meanings consistent with the context of the related art, and unless explicitly defined in the present specification, they are not to be interpreted in an ideal or excessively formal meaning.

Hereinafter, an exemplary embodiment of the present disclosure will be described in detail with reference to the accompanying drawings.

FIG. 1 depicts a charging control box and a charging cable in a conventional charging system, FIG. 2 depicts a charging cable in another conventional charging system, and FIG. 3 depicts a charging control box detachable charging cable according to an exemplary embodiment of the present disclosure.

As shown in FIG. 1, a conventional household (portable) charging system includes an in-cable control box (ICCB) 206 integrated with a charging cable 204. The charging cable 204 includes a power source cable provided with a plug 205. The plug 205 can be configured to be connected to an outlet of a household AC power source. The charging cable 204 also includes a vehicle cable extending from an outlet 203. The outlet 203 can be configured to be connected to an inlet of an in-vehicle battery that is to be charged using the AC power source. The ICCB 206 controls the supply of AC power to the in-vehicle battery by connecting the battery to the power source and cutting off the power source from the battery, depending upon charging information transmitted from a charging device. Also, when a leakage current is detected, the ICCB 206 can stop the charging process or operate a warning device that warns the user of the leakage current.

FIG. 2 depicts a conventional charging system for a charging stand. As shown in FIG. 2, the charging system is connected to the outlet 203, which is connected to the inlet of the in-vehicle battery to be charged. The outlet 203 connected to the inlet of the in-vehicle battery is supplied with AC power from the outlet 203 connected to the AC power source, via the charging cable 204

FIG. 3 depicts a charging control box detachable charging cable system according to an exemplary embodiment of the present disclosure. The system can be connected to the charging control box, which is capable of monitoring or controlling a power charging state of a vehicle. The charging control box has a first connection terminal (second control unit) 302 and a second connection terminal (third control unit) 303 formed on respective sides of the charging control box. The charging control box also has a first key k1 and a second key k2 formed on the first connection terminal and the second connection terminal, respectively.

The charging control box detachable charging cable system includes a vehicle cable (fourth control unit) C1 having a vehicle terminal 304 provided on one end thereof. The vehicle terminal 304 may be configured to be connected to the first connection terminal 303 of the charging control box. In addition, the vehicle terminal 304 can be connected to an external power source by way of a charger cable C3 of the system. The vehicle cable C1 also has an outlet 203 formed on the other end thereof. The vehicle cable C1 may be configured to be connected to the inlet of the vehicle having a battery to be charged, via the outlet 203 of the vehicle cable C1.

The charging control box detachable charging cable system also includes a portable cable (first control unit) C2 having one end configured to be connected to an external power source. The portable cable C2 also has a portable terminal 301 provided on the other end thereof. The portable terminal 301 may be configured to be connected to the second connection terminal 302 of the charging control box.

The vehicle terminal 304 of the vehicle cable C1 may be formed with a first corresponding key ck1 configured to engage and be coupled with the first key k1 of the first connection terminal 303 of the charging control box. The portable terminal 301 of the portable cable C2 is formed with a second corresponding key ck2 configured to engage and be coupled with the second key k2 of the second connection terminal 302.

The first corresponding key ck1 and the second corresponding key ck2 can engage, and can be coupled to the respective first key k1 and second key k2 of the charging control box by a latching arrangement using a button. Alternatively, the engagement and coupling of the first and second corresponding keys ck1, ck2 and the respective first and second keys k1, k2 may be achieved by clamping arrangement in which the connected portion is gripped by a grip member. In other alternative embodiments, the engagement and coupling may be achieved by a fitting projection in one housing, and a fitting groove disposed in the other housing and configured to surround the fitting projection. In other alternative embodiments, the engagement and coupling may be achieved by forming a step in each of the vehicle terminal 304 and the portable terminal 301, so that the vehicle terminal 304 and the portable terminal 301 can be coupled to the respective first and second keys k1, k2 by L-shaped areas on each of the vehicle terminal 304, the portable terminal 301, and the first and second keys k1, k2, with the L-shaped areas being inverted in relation to each other. In other alternative embodiments, the vehicle terminal 304 and the portable terminal 301 can be configured so that the fitting projection or the fitting groove protrudes, and engages the other of the fitting projection or fitting groove when a rotational force is applied to the vehicle terminal 304 or the portable terminal 301.

Referring still to FIG. 3, the charging control box has the first connection terminal (second control unit) 303 and the second connection terminal (third control unit) 302 formed on respective sides of the charging control box. The first key k1 and the second key k2 may be formed on the first connection terminal 303 and the second connection terminal 302, respectively.

The charging control box detachable charging cable system also includes the vehicle cable (fourth control unit) C1 having the vehicle terminal 304 provided on one end thereof. The vehicle terminal 304 may be configured to be connected to any one of the first connection terminal 304 of the charging control box; or an external power source by way of the charger cable C3. An outlet 203 is formed on the other end of the vehicle cable C1. The outlet 203 may be configured to be connected to a charging inlet or port of the vehicle with the battery to be charged.

The charging control box detachable charging cable system also includes the portable cable (first control unit) C2 having one end configured to be connected to an external power source in the form of a first power source. The portable cable C2 also has a portable terminal 301 provided on the other end thereof. The portable terminal 301 may be configured to be connected to the second connection terminal 302 of the charging control box.

The charging control box detachable charging cable system also includes the charger cable (fifth control unit) C3 having one end configured to be connected to another external power source in the form of a second power source. The other end of the charger cable C3 may be provided with a charger terminal 305. The charger terminal 305 may be configured with another first key k1 that permits the charger terminal to be connected to the vehicle terminal 304 of the vehicle cable C1 by way of the first corresponding key ck1 of the vehicle terminal 304.

The vehicle terminal 304 of the vehicle cable C1 may be formed with the first corresponding key ck1 configured to be engaged and coupled with the first key k1 of the first connection terminal (second control unit) 303 on the charging control box, and with a first key k1 of the charger terminal 305 of the charger cable C3.

The portable terminal 301 of the portable cable C2 may be formed with the second corresponding key ck2 configured to be engaged and coupled with the second key k2 of the second connection terminal (third control unit) 302 on the charging control box.

The charger terminal 305 of the charger cable C3 may be configured to engage and be coupled to the vehicle terminal 304 of the vehicle cable C1 by way the first corresponding key ck1 of the vehicle terminal 304.

Therefore, unlike the related art shown in FIGS. 1 and 2, in the charging control box detachable charging cable system according to the exemplary embodiment of the present disclosure, the charging cable C3 and the charging control box can be detached from each other, and a common, i.e., single, vehicle cable C1 can provide power to the vehicle from different sources of power, e.g., from either the second power source or the first power source. Therefore, the use of the system can help to address the problem of increasing the weight of the vehicle and the consumer's purchase cost caused by mounting and using all of the ICCB, the portable cable C2, and the charging cable C3 in the vehicle.

FIG. 4 depicts the vehicle terminal 304 and the portable terminal 301 of the charging control box detachable charging cable system according to the exemplary embodiment of the present disclosure. FIG. 5 depicts the charger terminal 305 of the charger cable (fifth control unit) C3. FIGS. 6A to 6C depict a configuration of the vehicle terminal 304. FIGS. 7A and 7B depict a configuration of the portable terminal 301. FIGS. 8A and 8B depict a configuration of the charger terminal 305.

FIG. 4 shows the vehicle terminal (the fourth control unit) 304 and the portable terminal (the first control unit) 301 of the charging control box detachable charging cable system according to the exemplary embodiment of the present disclosure. As shown in FIG. 4, the vehicle terminal (the fourth control unit) 304 can be formed with the first corresponding key ck1, and the first corresponding key ck1 is configured to engage, and be coupled with the first key k1 of the first connection terminal 303 of the charging control box. Likewise, the portable terminal (the first control unit) 301 can be formed with the second corresponding key ck2, and the second corresponding key ck2 is configured to engage and coupled with the second key k2 of the second connection terminal 302 of the charging control box.

FIG. 5 depicts the charger terminal (the fifth control unit) 305 and the vehicle terminal (the fourth control unit) 304 of the charging control box detachable charging cable system according to the exemplary embodiment of the present disclosure. As shown in FIG. 5, the charger terminal 305 can be formed with a first key k1; and this first key k1 can engage, and be coupled with the first corresponding key ck1 of the vehicle terminal 304.

FIGS. 6A to 6C depict a configuration of the vehicle terminal 304 of the charging control box detachable charging cable system according to the exemplary embodiment of the present disclosure. As shown in FIG. 6A, the first corresponding key ck1 of the vehicle terminal 304 may include a first key code 408 and a second key code 410 having different shapes. In addition, the vehicle terminal 304 may include a power source terminal 402 provided with a power source pin receiving the power source and a ground pin connected to the ground.

In addition, as shown in FIG. 6A, the vehicle terminal 304 may include a housing 407 surrounding the power pin and the ground pin, and a locking groove (not shown) formed outside the housing 407, and configured to be fitted to and coupled with any one of the first connection terminal 303 and the second connection terminal 302 on the of the charging control box. The locking groove has a structure corresponding to a locking lever (not shown) provided on the first connection terminal 303 and the second connection terminal 302, and maintains a fastened state when the first key k1 and the first corresponding key ck1, and the second key k2 and the second corresponding key ck2 are engaged and coupled. Therefore, it is possible to prevent an unintended, forcible detachment of the vehicle cable 304 from the charging control box.

In addition, as shown in FIG. 6A, according to the exemplary embodiment of the charging control box detachable charging cable system of the present disclosure, the housing 407 can include a wrench bolt 409 inserted so as not to be detached after being coupled with the first connection terminal 303 or the second connection terminal 302 of the charging control box. The wrench bolt 409 has a structure that helps prevent the properly fastened wrench bolt 409 from being detached by any user. Also, the wrench bolt 409 is formed so that the housing 407, and the first connection terminals 303 or the second connection terminal 302 are bolt-coupled, in addition to being fitted and coupled by the first key k1 and the first corresponding key ck1, or the second key k2 and the second corresponding key.

In addition, as shown in FIG. 6B, according to the exemplary embodiment of the charging control box detachable charging cable system of the present disclosure, the vehicle terminal 304 may include a signal terminal 404. The signal terminal 404 includes a temperature sensor pin provided with a temperature sensor configured to sense the temperature, and an interlock pin provided with an interlock circuit configured to sense fastened information regarding whether the first key k1 and the first corresponding key ck1, or the second key k2 and the second corresponding key ck2 are engaged and fastened to each other. There are two temperature sensor pins and two interlock pins on the lower portion of the vehicle terminal 304, and the shape of the inserted signal terminal 404 is not limited thereto.

In addition, the power source terminal 402 and the signal terminal 404 may be provided with an electric shock hole 406 so that the user's finger cannot be inserted into the power source terminal 402, to help avoid electric shock to the user. In other words, as shown in FIG. 6C, the housing surrounding the inserted the power source terminal 402 and signal terminal 404 terminals can be provided with the electric shock hole 406 into which the user's finger cannot be inserted forcibly, so that the terminal and the user's finger cannot contact power source terminal 402 and the signal terminal 404 terminal.

FIGS. 7A and 7B depict a configuration of the portable terminal 301 of the exemplary embodiment of the charging control box detachable charging cable system of the present disclosure. As shown in FIG. 7A, the second corresponding key ck2 of the portable terminal 301 can include a first key code 508 and a second key code 510 having different shapes. In addition, the vehicle terminal 304 and the portable terminal 301 can include the power source terminal 502 provided with a power source pin receiving the power source, and a ground pin connected to the ground. There are two power source pins and one ground pin on the upper portion of the charging control box detachable charging cable system, and the shape of the inserted power source terminal 502 is not limited thereto.

In addition, as shown in FIG. 7A, according to the exemplary embodiment of the charging control box detachable charging cable system of the present disclosure, each of a power source terminal 502 and a signal terminal 504 can be provided with a partition wall 509 surrounding the terminals. The partition wall 509 can help prevent electrical interference between the terminals.

In addition, as shown in FIG. 7A, according to the exemplary embodiment of the portable terminal 301 of the charging control box detachable charging cable system of the present disclosure, the power source terminal 502 can include a housing 507 surrounding the power source pin and the ground pin; and a locking groove 506 formed outside the housing, and fitted into and coupled with any one of the first connection terminal 303 or the second connection terminal 302 of the charging control box. The locking groove has a structure corresponding to a locking lever (not shown) provided on any one of the first connection terminal 303 and the second connection terminal 302 that maintains the fastened state where the first key k1 and the first corresponding key ck1, or the second key k2 and the second corresponding key ck2 are engaged and coupled. Therefore, it is possible to prevent an unintended situation where the portable cable is forcibly detached for the charging control box.

In addition, as shown in FIG. 7B, the portable terminal 301 may include the signal terminal 504 including the temperature sensor pin provided with the temperature sensor configured to sense the temperature; and the interlock pin provided with the interlock circuit configured to sense the fastened information on whether the first key k1 and the first corresponding key ck1 or the second key k2 and the second corresponding key ck2 are engaged and coupled with each other. There are two temperature sensor pins and two interlock pins on the lower portion of the portable terminal 301, and the shape of the inserted signal terminal 504 is not limited thereto.

In addition, the power source terminal 502 and/or the signal terminal 504 according to the present disclosure may include busbar assembling members 503, 505 assembled with a conductor having a separate busbar shape to be fastened to the control unit. Lastly, one end of the power source terminal 502 can include an insulating cap 501 configured to prevent electric shock to the user due to the contact with the power source terminal 502.

FIGS. 8A and 8B depict a configuration of the charger terminal 305 of the charging control box detachable charging cable according to the exemplary embodiment of the present disclosure. As shown in FIG. 8A, the first key k1 of the charger terminal can include a first key code 608 and a second key code 610 having different shapes. a power source terminal 602 can include a housing 607 surrounding a power source pin and a ground pin. The power source terminal 602 also can include a locking groove 606 formed outside the housing, and fitted into and coupled with any one of the first connection terminal 303 and the second connection terminal 302. The locking groove 606 has a structure corresponding to a locking lever (not shown) provided on any one of the first connection terminal 303 and the second connection terminal 302 that maintains the fastened state where the first key k1 and the first corresponding key ck1 or the second key k2 and the second corresponding key ck2 are engaged and coupled. Therefore, it is possible to prevent an unintended situation where the charging cable C3 is forcibly detached when the charging cable C3 is connected.

In addition, as shown in FIG. 8B, according to the exemplary embodiment of the charging control box detachable charging cable system of the present disclosure, the charger terminal 305 can include a signal terminal 604 including a temperature sensor pin provided with the temperature sensor configured to sense the temperature; and an interlock pin provided with the interlock circuit configured to sense fastening information regarding whether the first key k1 and the first corresponding key ck1 or the second key k2 and the second corresponding key ck2 are engaged and coupled with each other. There are two temperature sensor pins and two interlock pins on the lower portion of the portable terminal 301, and the shape of the inserted signal terminal 604 is not limited thereto. In addition, the power source terminal 602 and/or the signal terminal 604 according to the present disclosure can include busbar assembling members 603, 605 assembled with a conductor having a separate busbar shape to be fastened to the control unit. Lastly, one end of the power source terminal 602 can include an insulating cap 601 configured to prevent electric shock to a user due to the contact with the power source terminal 602.

In addition, as shown in FIG. 8A, according to the exemplary embodiment of the charging control box detachable charging cable system of the present disclosure, each of the power source terminal 602 and the signal terminal 604 can be provided with a partition wall 609 surrounding the terminals. The partition wall 609 can help prevent electrical interference between the power source terminal 602 and the signal terminal 604. In addition, the housing 607 can include a wrench bolt (not shown). The wrench bolt may be configured so as not to be detached after being coupled with the first connection terminal 303 or the second connection terminal 302. The wrench bolt has a structure the helps prevent the properly fastened state from being detached by any user, and is formed so that the housing 607 and the first connection terminal 303 or the second connection terminal 302 are bolt-coupled, in addition to the fitting and coupling between the first key k1 and the first corresponding key ck1 or the second key k2 and the second corresponding key ck2.

FIG. 9 is a diagram showing a configuration of detecting the erroneous fastening of the charging control box detachable charging cable system according to the exemplary embodiment of the present disclosure. An interlock circuit may include a voltage detection unit 108 configured to detect an output voltage output when an input voltage is input to the interlock circuit, and a control unit 102 configured to sense the fastened information based on the detected output voltage, and to interrupt operation of the charging control box if it is determined as being incompletely fastened.

As shown in FIG. 9, the resistance detection unit 106 can detect a resistance of a load connected to the cable and an internal resistance due to an external power source, and can determine a type of load or whether the cable is normally fastened to the external power source, based on the detected resistances. The voltage detection unit 108 can be connected to the power source and can detect a voltage of the interlock circuit when the cable and the external power source or the cable and the charging control box are fastened normally; and the voltage detection circuit 108 can detect another voltage of the interlock circuit if the noted components are fastened abnormally, to determine whether the cable and the external power source or the cable and the charging control box are fastened normally. If an abnormal fastening is detected, the control unit 102 performs a control of cutting off the external power source or interrupting the charging, or operating the warning device configured to warn the user. If normal fastening is detected, a power conversion unit 202 and the charging cable 204 decrease or increase a voltage of the external power source according to the voltage of the in-vehicle battery to slowly charge the battery.

Slow charging is a method for charging the battery mounted in the electric vehicle using the AC power supplied to the general household or workplace. The AC power may be provided through an outlet of the household or workplace, or an outlet embedded in a charging stand separately installed. The AC charging voltage may be, for example, 220 volts. The electric vehicle additionally may be provided with an on-board charger that is capable of increasing the AC power supplied to the vehicle, converting the AC power into the DC power, and supplying the converted DC power to the battery for slow charging.

In addition, the electric vehicle can be referred to as an electric car, an electric automobile, an electric road vehicle (ERV), a plug-in vehicle (PV), or a plug-in vehicle (xEV), in which the xEV can be referred to as or classified into a plug-in all-electric vehicle or battery electric vehicle (BEV), a plug-in electric vehicle (PEV), a hybrid electric vehicle (HEV), a hybrid plug-in electric vehicle (HPEV), or a plug-in hybrid electric vehicle (PHEV). In addition, the plug-in electric vehicle (PEV) can be referred to as an electric vehicle connected to a power grid to recharge the primary battery mounted in the vehicle. In the present specification, the plug-in vehicle (PV) can be referred to as a rechargeable vehicle chargeable through a wireless charging method without using a physical plug and socket from an electric vehicle supply equipment (EVSE). Heavy duty vehicles (H.D. Vehicles) can refer to all vehicles having four or more wheels defined in 49 CFR 523.6 or CFR 37.3(bus).

FIG. 10 is a diagram showing the interlock circuit of the charging control box detachable charging cable according system to the exemplary embodiment of the present disclosure. When the power source is applied to the system and the various fastenings of the system are completely fastened, an MCU signal within the control unit 102 of the interlock circuit is converted from High (+5 V) into Low (0 V). Therefore, the control unit 102 can confirm that each fastening is normal. Meanwhile, one or more of the fastenings are detached or otherwise improper, the MCU signal is converted from Low (0 V) into High (+5 V). Therefore, the control unit 102 can recognize that any one, or all of the respective fastenings are incompletely fastened, and can control unit 102 perform a control operation of interrupting the operation of the charging control box.

Also, the control unit 102 can confirm the fastened state of each fastening at a certain time or time interval. In addition, the control unit 102 can activate a normal fastening display device when the normal fastened state is sensed.

The exemplary embodiment of the present disclosure relates to the charging control box detachable charging cable system, and is provided with the detachable common cable. Therefore, according to the exemplary embodiment of the present disclosure, it is possible to address the problem of increasing the weight of the vehicle and the consumer's purchase cost caused by mounting and using all of the in-cable control box (ICCB), the portable cable connected to both ends of the in-cable control box, and the charging cable connected to the charging stand in the vehicle. In addition, according to the exemplary embodiment of the present disclosure, it is possible to provide a physical and electric device that confirms the fastened state of the cable and various charging devices, thereby preventing the cable and various charging devices from being improperly fastened.

Throughout the above specification, when it is said that a certain portion "comprises" or "includes" a certain component, it does not exclude other components, but can further include other components unless otherwise stated specially. In other words, in the present specification, it should be understood that the term "comprise" or "have" is intended to designate the presence of the described feature, area, number, step, operation, element, component, part, or combination thereof, but does not preclude the presence or addition of one or more other features, areas, numbers, steps, operations, elements, components, parts, or groups of combinations thereof in advance.

While the specific exemplary embodiment of the present disclosure has been shown and described, it will be apparent to those skilled in the art that the present disclosure can be variously improved and changed without departing from the technical spirit of the present disclosure provided by the appended claims.

What is claimed is:

1. A charging control box detachable charging cable system configured to be connected to a charging control box, the charging control box being configured to monitor or control a power charging state of a vehicle, the charging control box comprising: a first connection terminal and a second connection terminal disposed on opposite sides of the charging control box; a first key disposed on the first connection terminal, and a second key disposed on the second connection terminal, the charging control box detachable charging cable system comprising:
   a vehicle cable comprising a vehicle terminal disposed on a first end of the vehicle cable and configured to be connected to any one of the first connection terminal of the charging control box and an external power source, and an outlet disposed on a second end of the vehicle cable and configured to be connected to a charging inlet of a vehicle having a battery; and
   a portable cable comprising a first end configured to be connected to the external power source, and a portable terminal disposed on a second end of the portable cable and configured to be connected to the second connection terminal of the charging control box,
   wherein: the vehicle terminal of the vehicle cable comprises a first corresponding key configured to be engaged and coupled with the first key of the first connection terminal; and the portable terminal of the portable cable comprises a second corresponding key configured to be engaged and coupled with the second key of the second connection terminal;
   wherein the fit corresponding key and the second corresponding key comprise a first key code and a second key code, respectively; and the first key code and the second key code have different shapes;
   wherein the vehicle terminal and the portable terminal each comprise:
      a power source terminal provided with a power source pin receiving a power source; and
      a ground pin connected to a ground; and
   wherein one end of the power source terminal comprises an insulating cap configured to present electric shock to a user due to contact with the power source terminal.

2. A charging control box detachable charging cable system configured to be connected to a charging control box, the charging control box being configured to monitor or control a power charging state of a vehicle, the charging control box comprising: a first connection terminal and a second connection terminal disposed on opposite sides of the charging control box; a first key disposed on the first connection terminal; and a second key disposed on the second connection terminal, the charging control box detachable charging cable system comprising:
   a vehicle cable comprising a vehicle terminal disposed on a first end of the vehicle cable and configured to be connected to any one of the first connection terminal of the charging control box and an external power source; and an outlet disposed on a second end of the vehicle cable and configured to be connected to a charging inlet of a vehicle having a battery; and a portable cable comprising a first end configured to be connected to the external power source, and a portable terminal disposed on a second end of the portable cable and configured to be connected to the second connection terminal of the charging control box;

wherein the vehicle terminal of the vehicle cable comprises a first corresponding key configured to be engaged and coupled with the first key of the first connection terminal; and the portable terminal of the portable cable comprises a second corresponding key configured to be engaged and coupled with the second key of the second connection terminal, wherein the first corresponding key and the second corresponding key comprise a first key code and a second key code, respectively, and the first key code and the second key code have different shapes;

wherein the vehicle terminal and the portable terminal each comprise:
  a power source terminal provided with a power source pin receiving a power source; and
  a ground pin connected to a ground, and
wherein the power source terminal comprises:
  a housing surrounding the power source pin and the ground pin; and
  a locking groove formed outside the housing, and fitted into and coupled with any one of the first connection terminal and the second connection terminal.

3. The charging control box detachable charging cable system of claim 2, wherein the housing comprises a wrench bolt configured to be non-detachable when coupled with any one of the first connection terminal and the second connection terminal.

4. A charging control box detachable charging cable system configured to be connected to a charging control box, the charging control box being configured to monitor or control a power charging state of a vehicle, the charging control box comprising: a first connection terminal and a second connection terminal disposed on opposite sides of the charging control box; a first key disposed on the first connection terminal, and a second key disposed on the second connection terminal, the charging control box detachable charging cable system comprising:

a vehicle cable comprising a vehicle terminal disposed on a first end of the vehicle cable and configured to be connected to any one of the first connection terminal of the charging control box and an external power source; and an outlet disposed on a second end of the vehicle cable and configured to be connected to a charging inlet of a vehicle having a battery; and a portable cable comprising a first end configured to be connected to the external power source, and a portable terminal disposed on a second end of the portable cable and configured to be connected to the second connection terminal of the charging control box, wherein the vehicle terminal of the vehicle cable comprises a first corresponding key configured to be engaged and coupled with the first key of the first connection terminal; and the portable terminal of the portable cable comprises a second corresponding key configured to be engaged and coupled with the second key of the second connection terminal;

wherein the first corresponding key and the second corresponding key comprise a first key code and a second key code, respectively, and the first key code and the second key code have different shapes;

wherein the vehicle terminal and the portable terminal each comprise a signal terminal comprising:
  a temperature sensor pin comprising a temperature sensor configured to sense a temperature; and
  an interlock pin comprising an interlock circuit configured to sense fastened information relating to whether the first key and the first corresponding key are engaged and coupled with each other, and/or whether the second key and the second corresponding key are engaged and coupled with each other.

5. The charging control box detachable charging cable system of claim 4, wherein the interlock circuit further comprises:
  a voltage control unit configured to detect an output voltage output if an input voltage is input to the interlock circuit; and
  a control unit configured to sense fastened information based on the detected output voltage, and to interrupt operation of the charging control box if the fastened information indicates that the first key and the first corresponding key are not engaged and coupled with each other, and/or the second key and the second corresponding key are not engaged and coupled with each other.

6. A charging control box detachable charging cable system configured to be connected to a charging control box, the charging control box being configured to monitor or control a power charging state of a vehicle, the charging control box comprising: a first connection terminal and a second connection terminal disposed on opposite sides of the charging control box; a first key disposed on the first connection terminal, and a second key disposed on the second connection terminal, the charging control box detachable charging cable system comprising:

a vehicle cable comprising: a vehicle terminal disposed on a first end of the vehicle cable and configured to be connected to any one of the first connection terminal of the charging control box and an external power source and an outlet disposed on a second end of the vehicle cable and configured to be connected to a charging inlet of a vehicle having a battery;

a portable cable comprising: a first end configured to be connected to a first power source; and a portable terminal disposed on a second end of the portable cable and configured to be connected to the second connection terminal of the charging control box; and a charger cable comprising: a first end configured to be connected to a second power source; and a charger terminal disposed on a second end of the charger cable and configured to be connected to the vehicle terminal;

wherein: the vehicle terminal comprises a first corresponding key configured to be engaged and coupled with the first key of the first connection terminal; the portable terminal comprises a second corresponding key configured to be engaged and coupled with the second key of the second connection terminal; and the charger terminal comprises another first key configured to be engaged and coupled with the first corresponding key of the vehicle terminal.

7. The charging control box detachable charging cable system of claim 6, wherein:
  the first power source is a household AC power source; and
  the second power source is an AC power source for a slow charger.

8. The charging control box detachable charging cable system of claim 6, wherein:
- the first corresponding key and the second corresponding key comprise a first key code and a second key code, respectively; and
- the first key code and the second key code have different shapes.

9. The charging control box detachable charging cable system of claim 8, wherein the vehicle terminal, the portable terminal, and the charger terminal each comprise:
- a power source terminal provided with a power pin configured to receive a power source; and
- a ground pin configured to be connected to a ground.

10. The charging control box detachable charging cable system of claim 9, wherein one end of the power source terminal comprises an insulating cap configured to prevent electric shock to a user due to contact with the power source terminal.

11. The charging control box detachable charging cable system of claim 10, wherein the power source terminal comprises:
- a housing surrounding the power pin and the ground pin; and
- a locking groove formed outside the housing, and configured to be fitted into and coupled with any one of the first connection terminal and the second connection terminal.

12. The charging control box detachable charging cable system of claim 11, wherein the housing comprises a wrench bolt configured to be non-detachable when coupled with any one of the first connection terminal and the second connecter terminal.

\* \* \* \* \*